United States Patent Office 3,709,867
Patented Jan. 9, 1973

3,709,867
PROCESS FOR LUBRICATING VINYL POLYMERS WITH SITOSTEROL COMPOUNDS AND STABILIZED PRODUCT THEREOF
Joseph V. Karabinos, Milford, Conn., Karl M. Leopold, Toledo, Ohio, and William P. Doherty, Blacksburg, Va., assignors to Owens-Illinois, Inc.
No Drawing. Filed Nov. 22, 1971, Ser. No. 201,199
Int. Cl. C08f 45/34, 45/38
U.S. Cl. 260—28.5 A
8 Claims

ABSTRACT OF THE DISCLOSURE

Beta sitosterol, its isomers and aliphatic esters with from 2 to 18 carbon atoms and epoxidized forms thereof have been found to be excellent lubricants for processing vinyl polymers such as polyvinyl chloride. In addition, these sitosterol derivatives improve the stability of vinyl polymers when used with conventional stabilizers such as dibutyl tin laurate.

BACKGROUND OF THE INVENTION

Many polymers such as polyvinyl chloride, polymethacrylate, polyethylene, polystyrene and polypropylene tend to adhere to the walls of extruders, dies or hoppers which slows production and makes frequent cleaning necessary. This disadvantage has been avoided in the past by adding certain lubricants which have surface active properties and migrate to the interface of the polymer and metal equipment in which the material is processed. Typical lubricants include stearic acid and its salts such as lead stearate, calcium stearate or tin stearate, various amides, polyethylene oxides and fluorinated fatty acid esters.

Various stabilizers for polyvinyl compounds include phenyl-beta-naphthylamine, ethylphenyl ethanolamine, dimethylcyclohexylamine and dibutyl tin laurate which are generally used in conjunction with a lubricant. However, these materials are relatively expensive and sometimes exude from the finished plastic. Thus, the need arose to incorporate a lubricant as a processing aid for vinyl compounds which would also enhance the stabilizing effect of compounds such as dibutyl tin laurate or mercaptide previously used for this purpose.

SUMMARY OF THE INVENTION

We have discovered that vinyl polymers can be readily lubricated during processing and their stability enhanced by incorporating therewith a compound selected from the group consisting of sistosterol and a sitosterol compound of the formula

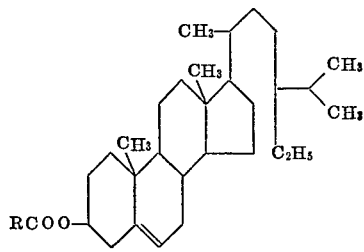

wherein R is an alkyl or alkenyl radical containing from 2 to 17 carbon atoms, inclusive, and epoxidized forms thereof. These sitosterols are used within the range of 0.01 to 5 parts by weight per 100 parts of polymer and preferably from 0.1 to 2.5 parts by weight per 100 parts of polymer.

THE PREFERRED EMBODIMENTS

The following examples further illustrate the nature and advantages of the invention. Although polyvinyl chloride was employed in these examples, it is to be understood that other vinyl polymers can likewise be lubricated and stabilized with beta sitosterol, its alpha and gamma isomers, aliphatic esters and epoxidized derivatives thereof. Representative polymers include polymerized forms of vinyl acetate, vinyl chloride-vinyl acetate copolymers, various vinylidene halides, vinyl fluoride, vinyl pyridine, vinyl carbazole, styrene, vinylbenzene, acrylic esters such as methyl acrylate, ethyl acrylate or methylmethacrylate as well as acrylonitrile.

EXAMPLE 1

A composition was prepared by mixing 100 parts by weight of Pantasote Kohiner R–687 (a polyvinyl chloride resin marketed by The Pantasote Co., 227 Park Avenue, New York, N.Y.); 15 parts by weight of Kureha BTA III S (a terpolymer of polymethacrylate, butadiene and styrene used as an impact modifier marketed by Marubeni-Iida America, Inc., 938 Merchandise Mart, Chicago, Ill.); 3 parts by weight of Acryloid K120N (a copolymer of methylmethacrylate and ethylacrylate used as a processing aid to improve mixing marketed by Rohm and Haas Co., Independence Mall West, Philadelphia, Pa.); 3 parts by weight of Argus Mark 1077A (a dibutyl-tin-organo complex used as a thermal stabilizer marketed by Argus Chemical Corp., 633 Court Street, Brooklyn, N.Y.) and 0.75 part by weight of Hoechst Wax OP and 0.15 part by weight of Hoechst Wax E (ethylene glycol diesters of montan wax used as lubricants marketed by American Hoechst Corp., 270 Sheffield Street, Mountainside, N.J.). This composition was used as a control.

A second composition was prepared by replacing the Hoechst waxes of the control compositions with one part by weight of beta-sitosterol and a third composition was prepared by substituting 4.6 parts by weight of beta-sitosterol for the waxes used as lubricants in the control composition. These two composiitons were compared to the control composition for various properties after preparing samples on a two roll mill or making blown containers. The bottle drop impact strength, hardness and melt flow viscosity as measured by standard test were all practically identical for the samples and containers made from compositions with beta-sitosterol and the control samples containing montan wax esters as lubricants. However, the samples containing beta-sitosterol had greater long term thermal stability and better early color than the control samples when subjected to an oven temperature of 190° C. Visually, the blown containers made with beta-sitosterol were somewhat hazy compared to the control containers and the haze increased at the higher concentration. No tendency of the polyvinyl chloride particles to stick to the surface of the mixer or to adhere to each other was observed in the samples containing beta-sitosterol indicating that this compound is a good lubricant in vinyl polymer processing.

EXAMPLES 2-6

Five different compositions were prepared by substituting the wax lubricant of the control composition of Example 1 with one part by weight respectively of beta-sitosterol acetate, beta-sitosterol stearate, epoxidized beta-sitosterol, epoxidized beta-sitosterol oleate and epoxidized beta-sitosterol linoleate. The properties of these sitosterol compositions were then compared with the control composition containing Hoechst waxes as a lubricant. Based upon the flow characteristics, hardness and impact strength data, it was found that the lubricating properties of the compositions containing these sitosterol derivatives were comparable in all respects to the control composition containing a very efficient wax as a lubricant for polyvinyl chloride. Bottles blown from the sitosterol containing compositions had excellent appearance and color. Thermal stability tests at 190° C. confirmed that the sitosterol compositions employed would withstand such heat for a longer period of time than the control composition.

The processing aids used in the foregoing examples are not essential in establishing the lubricating and stabilizing effects of sitosterol and its alkyl and alkenyl derivatives on vinyl polymers. In fact, all that is required is a mixture of the vinyl polymer and one of the sitosterol compounds to carry out the present invention and observe the highly desirable lubricating and stabilizing effects obtained.

If desired, one can substitute the alpha or gamma isomers of sitosterol for the beta isomer employed in the examples with equally good results. Likewise, any polymer containing a vinyl group can be lubricated and stabilized with such sitosterol compounds but preferable polymers include polyvinyl chloride, polyvinyl acetate, polystyrene and vinyl halide-vinylidene halide copolymers.

What we claim is:

1. A composition consisting essentially of a vinyl polymer and from 0.01 to 5 parts by weight per 100 parts of vinyl polymer of a compound selected from the group consisting of sitosterol and a sitosterol compound of the formula

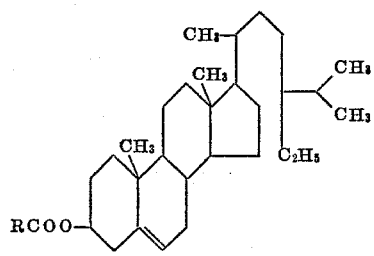

wherein R is selected from the group consisting of alkyl and alkenyl radicals containing from 2 to 17 carbon atoms inclusive and epoxidized forms thereof.

2. A composition as in claim 1 in which the sitosterol compound is beta-sitosterol.

3. A composition as in claim 1 in which the sitosterol compound is beta-sitosterol acetate.

4. A composition as in claim 1 in which the sitosterol compound is beta-sitosterol stearate.

5. A composition as in claim 1 in which the sitosterol compound is epoxidized beta-sitosterol.

6. A composition as in claim 1 in which the sitosterol compound is epoxidized beta-sitosterol oleate.

7. A composition as in claim 1 in which the sitosterol

8. A composition as in claim 1 in which the vinyl polymer is polyvinyl chloride.

References Cited
UNITED STATES PATENTS
3,301,830   1/1967   Nelson _____ 260—397.2

MORRIS LIEBMAN, Primary Examiner

J. H. DERRINGTON, Assistant Examiner

U.S. Cl. X.R.

260—28.5 D, 28.5 R, 45.7 R, 45.8 A, 45.85

PO-1050
(5/69)

UNITED STATES PATENT OFFICE
CERTIFICATE OF CORRECTION

Patent No. 3,709,867                    Dated January 9, 1973

Inventor(s) Joseph V. Karabinos, Karl M. Leopold & William P. Doherty

It is certified that error appears in the above-identified patent and that said Letters Patent are hereby corrected as shown below:

Column 4, line 27 after "sitosterol" insert --compound is epoxidized beta-sitosterol linoleate--.

Signed and sealed this 29th day of May 1973.

(SEAL)
Attest:

EDWARD M. FLETCHER, JR.                 ROBERT GOTTSCHALK
Attesting Officer                       Commissioner of Patents